(12) United States Patent
Hicks et al.

(10) Patent No.: US 10,772,300 B1
(45) Date of Patent: Sep. 15, 2020

(54) PET WASTE SCOOPER

(71) Applicants: Dennis Hicks, Newark, NJ (US); Gloria Hicks, Newark, NJ (US)

(72) Inventors: Dennis Hicks, Newark, NJ (US); Gloria Hicks, Newark, NJ (US)

( * ) Notice: Subject to any disclaimer, the term of this patent is extended or adjusted under 35 U.S.C. 154(b) by 0 days.

(21) Appl. No.: 16/661,322

(22) Filed: Oct. 23, 2019

(51) Int. Cl.
*A01K 29/00* (2006.01)
*A01K 23/00* (2006.01)
*E01H 1/12* (2006.01)

(52) U.S. Cl.
CPC ...... *A01K 23/005* (2013.01); *E01H 2001/128* (2013.01); *E01H 2001/1266* (2013.01)

(58) Field of Classification Search
CPC ............... A01K 23/005; E01H 1/1206; E01H 2001/122; E01H 2001/1226; E01H 2001/1266; E01H 2001/128; E01H 2001/1293
USPC .......................................................... 294/1.5
See application file for complete search history.

(56) References Cited

U.S. PATENT DOCUMENTS

| | | | | |
|---|---|---|---|---|
| 4,878,703 A * | 11/1989 | Yoshioka | ............ | A01K 23/005 294/1.5 |
| 7,198,310 B1 * | 4/2007 | Lau | ............. | A01K 23/005 294/1.5 |
| 7,407,207 B2 * | 8/2008 | Yilmaz | ............. | A01K 23/005 294/1.4 |
| 9,072,280 B1 * | 7/2015 | Ramoutar | ............ | A01K 23/005 |
| 9,420,762 B2 * | 8/2016 | Brasuel | ............. | A01K 23/005 |
| 10,465,351 B1 * | 11/2019 | Perez | ............. | A01K 23/005 |
| 2007/0176444 A1 * | 8/2007 | Pilas | ............. | A01K 23/005 294/1.5 |
| 2008/0098959 A1 * | 5/2008 | Iarrusso | ............. | A01K 23/005 119/161 |
| 2009/0096227 A1 * | 4/2009 | Pender | ............. | A01K 23/005 294/1.5 |
| 2015/0021943 A1 * | 1/2015 | Montgomery | ........ | E01H 1/1206 294/1.4 |
| 2015/0042112 A1 * | 2/2015 | Briski | ............. | E01H 1/1206 294/1.4 |

* cited by examiner

*Primary Examiner* — Dean J Kramer
(74) *Attorney, Agent, or Firm* — Sanchelima & Associates, P.A.; Christian Sanchelima; Jesus Sanchelima

(57) ABSTRACT

A pet waste grasping device including a telescopic assembly, a claw assembly, a light assembly and a bag assembly is disclosed. The pet waste grasping device is a pet waste scooper for collecting of pet waste without the need for a user to come in direct contact with the pet waste. The pet waste grasping device include an elongated shaft having a handle and a trigger-like actuator at the proximal end of the shaft, wherein the distal end of the shaft supports an illumination device that projects light downward and a series of extendable fingers which retract and expand when the trigger-like actuator is manipulated to release a bag with pet waste therein. The extendable fingers support the bag which is preferably a plastic bag that is placed over the extendable fingers manually.

11 Claims, 3 Drawing Sheets

PET WASTE SCOOPER

BACKGROUND OF THE INVENTION

1. Field of the Invention

The present invention relates to a pet waste scooper and, more particularly, to a pet waste scooper that allows a user to collect the waste of their pet without ever having to come in direct contact with the pet waste.

2. Description of the Related Art

Several designs for pet waste scoopers have been designed in the past. None of them, however, include a pet waste grasping device comprising an elongated shaft having a handle and a trigger-like actuator at the proximal end, wherein the distal end of the shaft supports an illumination device that projects light downward and a series of extendable fingers which retract or expand when the trigger-like actuator is manipulated. The finger supports a plastic bag that is placed over the fingers manually.

Applicant believes that a related reference corresponds to U.S. patent No. 2015/0021943 for a pick up tool for pet waste or the like that uses a claw with a bag attached to it. Another related reference corresponds to U.S. patent No. 2015/0042112 for a scooper which includes pivoting scoop jaws. None of these references, however, teach of a pet waste scooper that includes extendable fingers capable of releasing a bag being held therein once actuated by a trigger-like actuator to allow disposal of the bag and pet waste collected without the need for a user to make contact with the pet waste.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pet waste collector that is expandable in dimensions for ease of use with pets of different sizes.

It is another object of this invention to provide a pet waste collector that allows collecting of pet waste without the need for a user to come in contact with the pet waste.

It is still another object of the present invention to provide a pet waste collector that allows for quick and easy disposal of the collected pet waste.

It is another object of the present invention to provide a pet waste collector that can be easily used by capable users despite age.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
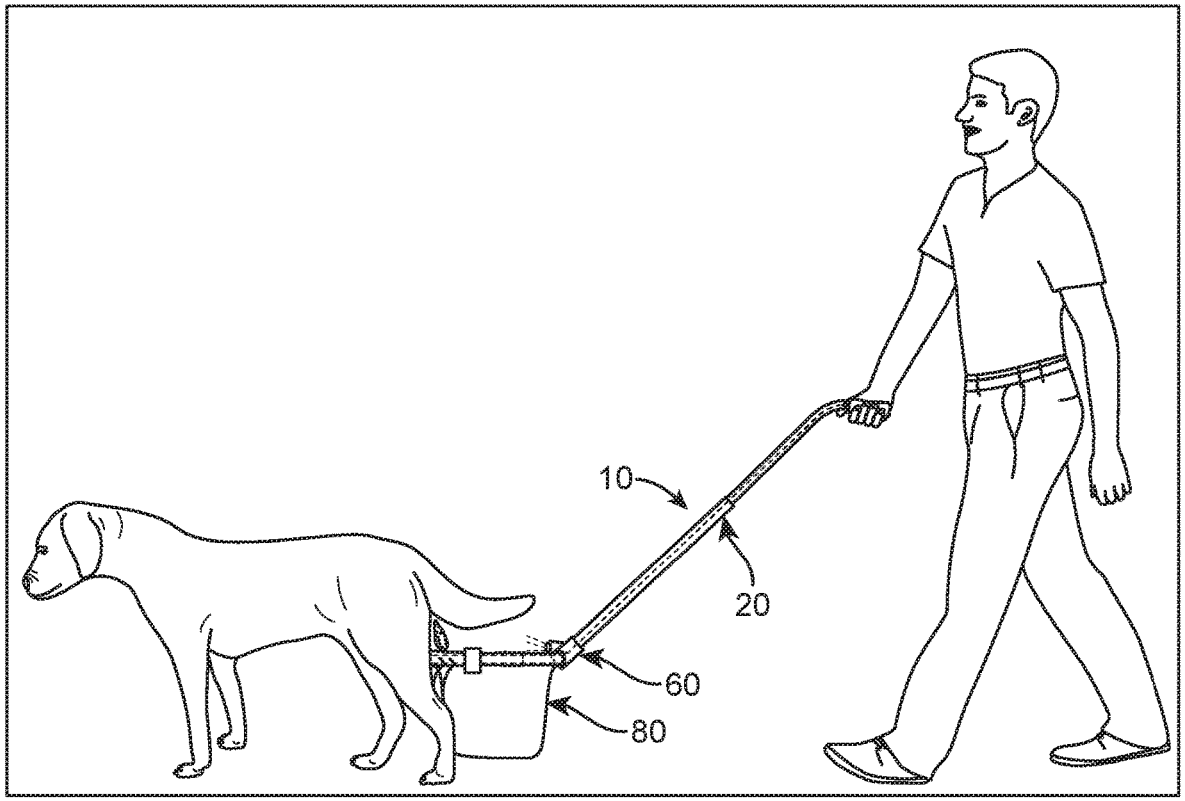
FIG. 1 represents the present invention in an operational setting.
Figure 2:
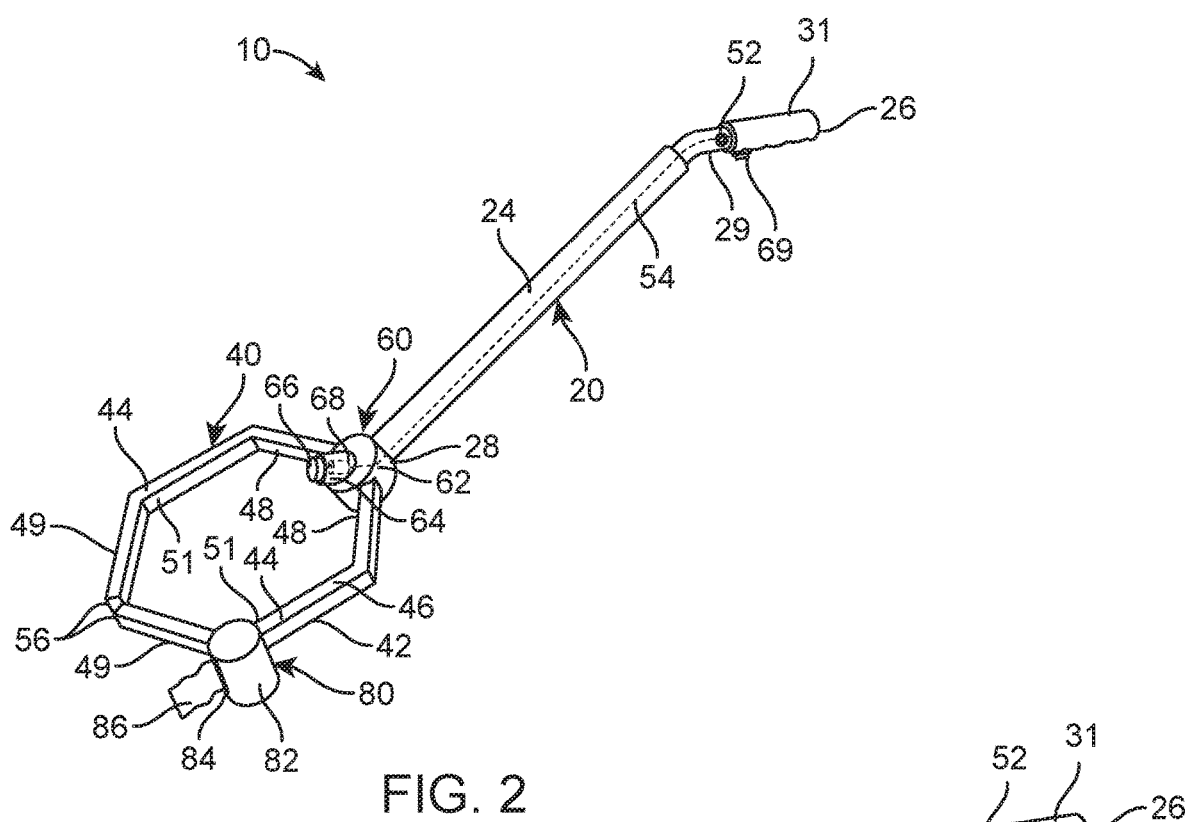
FIG. 2 shows an isometric view of the present invention in a collapsed configuration.
Figure 3:
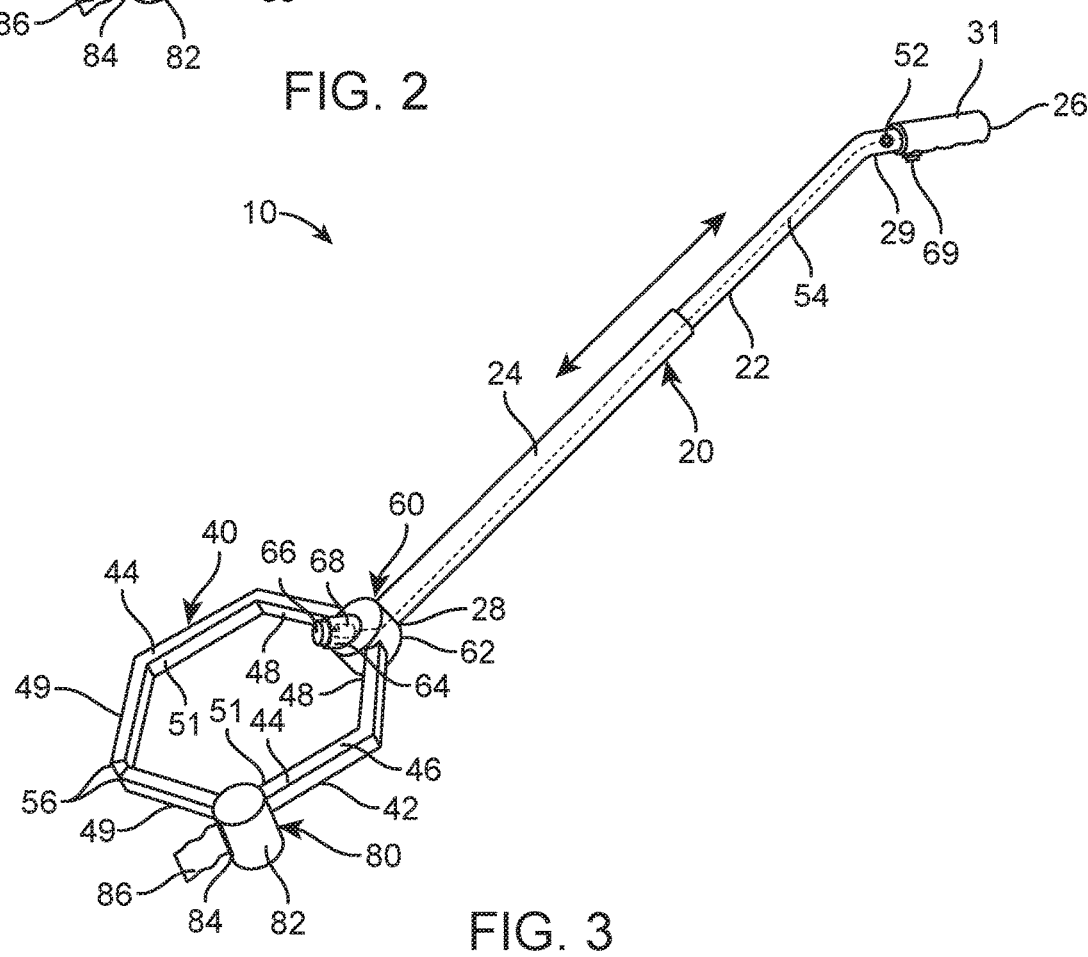
FIG. 3 illustrates an isometric view of the present invention in an expanded configuration.
Figure 4:
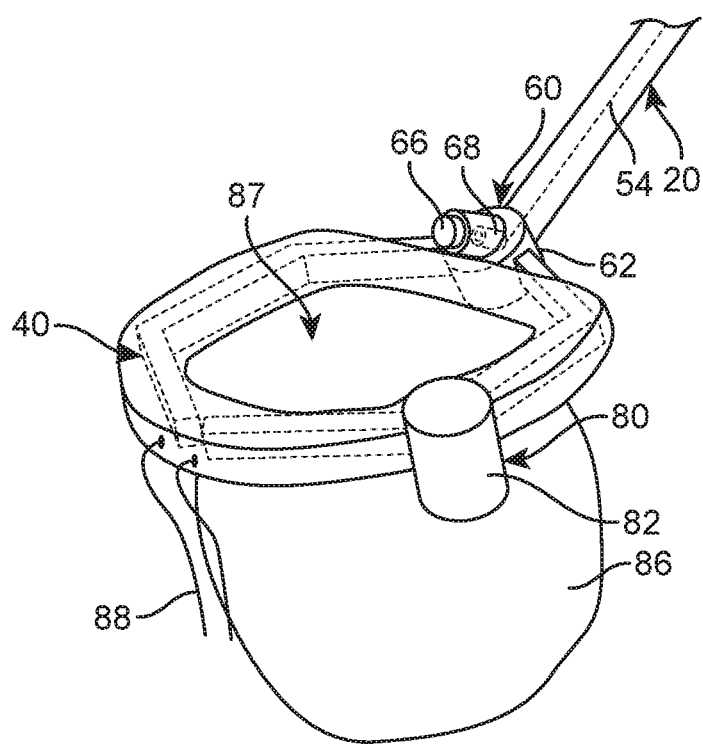
FIG. 4 is a representation of a zoomed in view of a claw assembly with a bag mounted thereon.

Referring now to the drawings, where the present invention is generally referred to with numeral 10, it can be observed that it, a pet waste grasping device 10, basically includes a telescopic assembly 20, a claw assembly 40, a light assembly 60 and a bag assembly 80.

Pet waste grasping device 10 importantly includes telescopic assembly 20 which allows for usage of the present invention by a user U regardless of age and stature. Further, telescopic assembly 20 allows for the present invention to be used on a pet P regardless the shape and size of pet P. Telescopic assembly 20 aids in facilitating the usage of the present invention for pets of different sizes by users of different sizes. Telescopic assembly 20 includes an elongated shaft 22. Elongated shaft 22 may include a body 24 that is preferably telescopic. Body 24 being telescopic allows for elongated shaft 22 to be set to different lengths for accommodating usage by user U regardless of their size. It may be suitable for body 24 to be made of plastic, steel, aluminum, or the like in order to be lightweight and durable. Body 24 of elongated shaft 22 may have a collapsed configuration when body 24 is entirely retracted. Body 24 of elongated shaft 22 may have an expanded configuration when body 24 is entirely expanded. Body 24 may have a first end 26 and a second end 28. Body 24 may be substantially straight. However, at first end 26 body 24 may include a curved portion 29 that extends rearwardly from the otherwise straight portion of body 24. At first end 26 may be a handle 31 mounted thereon, more specifically mounted above curved portion 29. Handle 31 may be adapted to provide comfort and grip to user U operating the present invention as such handle 31 may preferably be made of rubber, plastic or the like. Handle 31 may be of a shape that cooperates with receiving a hand of use U. Handle 31 may be of predetermined dimensions, however, it should be understood that handle 31 preferably extends along a substantial portion of curved portion 29.

Pet waste grasping device 10 may include light assembly 60 at second end 28 thereof. Light assembly 60 may include a housing 62 extending therefrom elongated shaft 24 and more specifically therefrom body 24. In one embodiment, housing 62 may be substantially cylindrical. Housing 62 may include a housing extension 64 protruding outwardly from housing 62. In one embodiment, housing extension 64 may protrude diagonally outwardly from housing 62. Therein housing 62 may be housed a battery 68 adapted to provide power to an illumination device 66 housed therein housing extension. In one embodiment, battery 68 may be rechargeable. Illumination device 66 may be a light such as an LED light, in one embodiment. Illumination device 66 may be adapted to emit light to illuminate a surrounding area for ease of seeing the surrounding area. Illumination device 66 may be adapted to provide light to be able to see the surrounding area at night, for example. Preferably, for comfortability to user U, nearest to first end 26 or to curved portion 29 may be a light button 69 adapted to turn on and off illumination device 66 upon actuation thereof. However, it should be understood that is may be suitable for light button 69 to be located virtually anywhere on pet waste grasping device. Illumination device 66, battery 68 and light button 69 may be interconnected by means as known in the art of electronics for interaction therebetween.

Pet waste grasping device 10 may further include claw assembly 40, preferably mounted thereon light assembly 60. Claw assembly 40 may include extendable fingers 42 extending therefrom the lateral sides of housing 62. More specifically, extendable fingers 42 may include a first finger 44 and a second finger 46. First finger 44 may extend from a lateral side of housing 62 while second finger 46 may extend from an opposite lateral side of housing 62. Extendable fingers 42 may have an open position and a closed position. In the open position, a front end 56 of first finger 44 and second finger 46 may extend outwardly and away from one another as to not be in contact with one another. In the closed position, front end 56 of first finger 44 and second finger 46 may retract inwardly to allow first finger 44 and second finger 46 to make contact with one another, preferably at front end 56 thereof. The inward and outward move of extendable fingers 42 is possible due to a cable 54 that runs along telescopic assembly 20. In one embodiment, cable 54 runs along the inside or interior of elongated shaft 22. In an alternate embodiment, cable 54 may run adjacently along elongated shaft 22. On one end, cable 54 may be connected to extendable fingers 42 at second end 28 by known means in the art. On an opposite end, cable 54 may be connected to a trigger like actuator 52. Upon actuation of trigger like actuator 52 cable 54 may have tension created thereon to allow for extendable fingers 42 to expand outwardly thereby extendable fingers reach the open position. Trigger like actuator 52 may be actuated to release tension on cable 52 as well thereby allowing extendable fingers 42 to retract inwardly to achieve the closed position thereof. Trigger like actuator 52 may create or release tension on cable 54 to open and close extendable fingers 42 as such extendable fingers 42 and cable 54 are interconnected by means known in the art that would allow for the tension creation and release thereof. Extendable fingers 42 being first finger 44 and second finger 46 may each include a diagonal portion 48 extending outwardly from housing 62 at a predetermined angle. Mounted thereto a distal end of diagonal portion 48 may be a straight portion 51 extending at a predetermined angle from diagonal portion 48. Mounted thereto a distal end of straight portion 51 may be a second diagonal portion 49 extending inwardly from straight portion 51. In one embodiment, first finger 44 and second finger 46 may be identical to one another but being mirror opposites. Each of diagonal portion 48, second diagonal portion 49 and straight portion 51 may be of predetermined dimensions.

The present invention may include bag assembly 80. Bag assembly 80 may preferably be removably mounted to one of extendable fingers 42. Bag assembly 80 may be mounted to extendable fingers 42 by fasteners, hook and loop straps, snap buttons, buttons, screws or the like as known in the art. Bag assembly 80 may include bag compartment 82 of predetermined shapes and dimensions. Bag compartment 82 may include a compartment opening 84 to allow access to the interior of bag compartment 82. Therein bag compartment 82 may be stored bags 86, preferably being plastic bags. Bags 86 may also preferably be biodegradable. Bags 86 may include a bag drawstring 88. For ease of retrieving one of bags 86 from bag compartment 82, a portion of one of bags 86 may extend through compartment opening 84. Once it is time to use and operate the present invention, user U removes one of bags 86 from bag compartment 82 and manually places one of bags 86 around extendable fingers 42 once extendable fingers 42 are in a closed position allowing a bag opening 87 to extend therebetween extendable fingers 42. User U may then take the present invention and place it directly underneath a pet P releasing pet waste W to allow for catching pet waste W therein one of bags 86 through bag opening 87. Once all of pet waste W has been collected therein one of bags 86, trigger like actuator 52 may be operated to expand extendable fingers 42 thereby releasing one of bags 86 mounted thereto extendable fingers 42. User U may then pick up the plastic bag and seal it by pulling on bag drawstring 88 to maintain pet waste W inside of the plastic bag when disposal of the bag is occurring. This allows for collection and disposal of pet waste W without user U making contact with pet waste W.

It should be understood that the present invention and all components are not limited to being of one particular shape, color, dimension or material. It should be understood that plastic, rubber, metal, aluminum, or other materials may be suitable for the present invention and its components. Materials which make the present invention light weight are preferred. Materials that aid in the durability of the present invention may also be preferred.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a pet waste grasping device, comprising:
   a. a telescopic assembly including an elongated shaft having a body, said body including a first end and a second end, said body having a curved portion nearest to said first end;
   b. a light assembly mounted to the telescopic assembly at a second end of said body, said light assembly including a housing and a housing extension mounted diagonally to said housing, housed therein said housing extension is an illumination device powered by a battery housed therein said housing, said illumination being actuated by a light button mounted on said body nearest said first end thereof;
   c. a claw assembly mounted thereto said light assembly, said claw assembly including extendable fingers protruding outwardly from said housing, said extendable fingers defined by a first finger and a second finger, said extendable fingers having an open and closed position, said claw assembly further including a trigger-like actuator on said body near a top end, said claw assembly having a cable along an interior of said elongated shaft, said cable connected to said extendable fingers on one end and said trigger-like actuator on an opposite end thereof, said extendable fingers capable of moving from the closed position to the open position and vice versa upon actuation of said trigger-like actuator, said extendable fingers extending outwardly and away from each other upon said trigger-like actuator being actuated to achieve the open position, said first finger and said second finger each defined by a diagonal portion extending outwardly from said housing at a predetermined angle, said diagonal portion having a straight portion mounted to said diagonal portion, said straight portion having a second diagonal portion mounted thereon, said second diagonal portion extending inwardly at a predetermined angle therefrom said straight portion, said first finger and said second finger making contact at a front end thereof when in the said closed position;

d. a bag assembly including a bag compartment mounted to one of said extendable fingers, said bag compartment having a compartment opening to allow access to where bags are received, held and stored, said bags are mounted around said extendable fingers with a bag opening entirely extending therebetween said extendable fingers, said bag opening being at a top end of one of said bags being extended therebetween said extendable fingers, said pet waste grasping device being placed underneath a pet with one of said bags mounted thereon to allow pet waste to drop inside of said bags for easy collecting thereof.

2. The system of claim 1, wherein said body includes a handle mounted thereon said first end.

3. The system of claim 1, wherein said elongated shaft is telescopic.

4. The system of claim 1, wherein said battery is rechargeable.

5. The system of claim 1, wherein said illumination device is an LED light.

6. The system of claim 1, wherein said first finger and said second finger are mirror opposites.

7. The system of claim 1, wherein said bag assembly is removable.

8. The system of claim 1, wherein said bags are plastic bags.

9. The system of claim 8, wherein said plastic bags are biodegradable.

10. The system of claim of 1, wherein said bags are manually mounted around said extendable fingers.

11. The system of claim 1, wherein said bags are manually sealed with pulling of a bag drawstring mounted around a perimeter of said bag opening once said pet waste has been collected inside one of said bags.

* * * * *